United States Patent [19]

Debarbieri et al.

[11] Patent Number: 4,642,752
[45] Date of Patent: Feb. 10, 1987

[54] PROGRAMMABLE AUTOMATIC MANIPULATOR SYSTEM

[75] Inventors: Franco Debarbieri, Genoa; Roberto Montorsi, Sesto Calende; Giancarlo Zaramella, Turin, all of Italy

[73] Assignee: Armco, Inc., Middletown, Ohio

[21] Appl. No.: 676,525

[22] Filed: Nov. 30, 1984

[30] Foreign Application Priority Data

Nov. 30, 1983 [IT] Italy ............................ 12685 A/83

[51] Int. Cl.$^4$ ............................................ G05B 19/00
[52] U.S. Cl. ................................... 364/167; 364/513; 901/3; 901/42
[58] Field of Search ................ 364/513, 167; 318/568, 318/575, 576, 569; 219/124.34, 125.1; 901/3, 4, 5, 42, 46

[56] References Cited

U.S. PATENT DOCUMENTS

| | | | |
|---|---|---|---|
| 4,130,873 | 12/1978 | Fioretta | 364/513 |
| 4,234,777 | 11/1980 | Balfanz | 318/661 |
| 4,255,643 | 3/1981 | Balfanz | 219/125.1 |
| 4,258,425 | 3/1981 | Ramsey | 364/513 |
| 4,380,696 | 4/1983 | Masaki | 219/124.34 |
| 4,448,342 | 5/1984 | Abe | 219/124.34 |
| 4,568,816 | 2/1986 | Casler | 219/124.34 |

Primary Examiner—Jerry Smith
Assistant Examiner—Allen MacDonald
Attorney, Agent, or Firm—Arnold, White & Durkee

[57] ABSTRACT

A programmable automatic manipulator system, implementable in an arc welding application, involves a manipulator member which may be pre-programmed to move about a plurality of axes of movement. A path sensing probe is connected to a tool attached to the end of the manipulator member in order to detect deviations along the path to be followed. The detected deviations are used to program a desired path of movement and also to adjust the path of movement of the tool in a playback mode in accordance with actual conditions sensed by the probe. Probe signals are periodically interrogated in both the teaching and playback mode in order to detect the extent of deviation of the path from a straight line. The smaller deviations are automatically implemented between interrogation cycles while the larger deviations are stored in the teach mode for retention within the permanent register that contains the program recording the path of movement. An interpolator generates a straight line equation which connects each pair of adjacent significant points during execution or playback. The tool follows the programmed path of movement with corrections being periodically implemented through a probe position interrogation during the playback mode. If any given workpiece which is being operated upon has unexpected deviations which were not previously programmed, the apparatus is able to adjust to slight deviations through the interrogation of the probe during playback.

18 Claims, 7 Drawing Figures

PROGRAMMABLE AUTOMATIC MANIPULATOR SYSTEM

BACKGROUND OF THE INVENTION

1. Field of the Invention

This invention relates generally to programmable manipulator apparatus, commonly known as robots, which enable the positioning, in at least two dimensions, of a workpiece altering tool, and further to methods of operating these apparatus. In one specific embodiment, the present invention relates to a manipulator system specifically adapted for welding.

2. Brief Description of the Background Art

In the past a number of operations required to transform a workpiece from a first state to a second or usable state have been done in a manual or semi-automatic fashion. In manual operations, the workpiece is totally transformed to its usable state by worker manipulations. In the semi-automatic mode a tool which holds the workpiece and simultaneously operates under selective control by an operator is utilized. Of course the success of either the manual or semi-automatic operations is limited, to varying degrees, by the operator's own capability.

In relatively recent times automatic machines have become available for workpiece operations. For example, a number of commercial robots are available which are capable of performing various operations on a workpiece. Devices of this kind are known for painting, welding, machining, part assembly, article transfer and the like. However, many of these commercial devices are limited to specific motions or specific operations on very limited types of workpieces. For example, a given welding robot may be adaptable to only certain types of workpieces. If a deviation or irregularity occurs in the workpiece, the robot is unable to deal with the unexpected situation. Thus a conventional manipulator apparatus is usually subject to very poor flexibility in operation and specifically to a very limited ability to adapt to changed circumstances.

The ultimate aim for many applications in the field of robotics is to develop a device capable not only of performing operations in an automated fashion, but moreover, and perhaps more importantly, capable of, at least to a limited degree, programming subsequent operations on its own. Despite the many advantages which have been achieved through the development of automated devices, it is recognized that much of the programming operation, particularly in the field of numerical controls, is extremely tedious and very time consuming. If this programming is not performed accurately the overall quality of the operation may be less acceptable than that achieved with the conventional manual or semi-automatic processing.

So called "self-programming" devices have been known in the past. For example, in U.S. Pat. No. 4,258,425 to Ramsey, et al. a self-programmed mechanical working apparatus is disclosed. This patent illustrates a welding robot capable of progressing along a seam to be welded on its own and memorizing point coordinate/slope data along the seam, using a seam contacting probe, to enable subsequent performance in a playback mode of the programmed welding operation. The memorized points are recorded in a periodic fashion without any decision being made as to which points should be programmed. In addition a third degree polynomial or spline function is used to interpolate between or to connect the various memorized points. The probe is removed or retracted in the playback mode.

While relatively complex mathematical interpolation techniques may be capable of achieving an extremely close fit to a desired weld path, the generation of these equations could have a number of disadvantages. The most important of these disadvantages is that a great deal of computing power may be tied up in generating the polynomial calculations. Furthermore, a great deal of memory may be tied up in recording the relatively large amount of data necessary to implement these techniques.

It has also been suggested in the prior art to utilize in a playback mode only certain significant points along a path to be recorded. In U.S. Pat. No. 4,130,873 to Fioretta, et al., an automatic machine with an articulated mechanical arm uses a straight line interpolation technique to connect various "significant" points along a path to be followed. However, the apparatus records all of the data points on magnetic tape. This data is subsequently processed to derive the significant points. Thus, the apparatus disclosed may be capable of recording a desired path of movement along a workpiece in a rough kind of way. The device may thereafter be capable of following the work path to what may amount to an acceptable degree of preciseness. However, it would appear that it would not be possible to closely follow a precise path along a workpiece using this arrangement and that a significant amount of data processing would be necessary.

It may be observed that in a variety of fields in which programmed manipulators are utilized it is desirable to repetitively and identically process a number of successive workpieces. After an initial programming or path learning mode it would be desirable to thereafter consecutively operate on workpieces in a repetitive fashion. One problem that commonly arises is that subsequent workpieces are limited by various manufacturing parameters so that they may not all be precisely identical. These irregularities in specific subsequent workpieces may arise from a number of factors including out-of-tolerance parts, manufacturing defects, material defects, and distortions which occur randomly during the manufacturing process.

When the programmed apparatus attempts to follow a workpiece seam to be welded and it encounters distortions, conventional apparatus may be incapable of adapting to such unexpected conditions. The program "tells" the apparatus to follow a certain pattern of movement and yet the workpiece itself may prevent the apparatus from doing so. The usual result is shutdown of the apparatus, but sometimes damage to the machine and the workpiece may result as well.

This problem was recognized in the Ramsey patent described above. However, in response to an out-of-tolerance condition, the device disclosed in the Ramsey patent merely provides an indication to the operator and shuts down. Then operator intervention is required so that truly automated operation is no longer possible.

The inventors of the present invention have appreciated that it would be highly desirable to provide a programmed manipulator, adaptable to unexpected conditions during the performance of an automated operation, that requires a minimum of computational power and data storage capacity. However such a device must also be capable of providing the necessary degree of precision of repetitive movement. A review of the prior art would likely lead one skilled in the art to believe that these goals are inconsistent with one another or even mutually exclusive.

SUMMARY OF THE INVENTION

It is a primary object of the present invention to provide a programmable manipulator system capable of decreasing the required amount of stored data and the necessary computational power without sacrificing the precision of repetitive path following motion.

It is yet another object of the present invention to provide such a system capable of adapting to changed conditions in successive workpieces without altering the previously stored program of operation.

It is still another object of the present invention to provide such a system which is capable of simultaneously undergoing the performance of a desired operation while learning, for subsequent repetition, a series of steps in a programmed pattern of movement.

It is yet a further object of the present invention to provide such a system which is self-programmable to follow a desired pattern of movement on a repetitive basis.

It is also an object of the present invention to provide such an system which is particularly suitable for performing arc welding operations.

In accordance with one embodiment of the present invention, these and other objects of the present invention may be achieved by a programmable automatic manipulator apparatus adapted to move along a path defined on a workpiece. The apparatus may include a manipulator member capable of mounting a tool whose position is controllable by the apparatus in at least two dimensions. A path following probe is mounted on the member adjacent the tool. The probe includes a path sensing finger that may be displaceable with respect to the rest of the probe. The probe further includes a transducer for converting sensed path variations, such as those sensed by displacements of the finger with respect to the rest of the probe, into workpiece position signals. During a self-teaching mode of operation an interrogator periodically samples the position signals. The interrogator includes a means for calculating a mathematical representation of the sensed path in terms of manipulator apparatus coordinates and means for storing the calculated path coordinates in temporary storage. A tool position control corrects the tool position in response to the representations of the position signals temporarily stored before the tool completely traverses the path. The interrogator also includes a comparator for determining whether the deviation of the path from a presumed line exceeds a predetermined extent. A permanent data storage medium is adapted to permanently store a representation of the sample position signals that exceed a predetermined extent.

In accordance with another embodiment of the present invention, a method for programmed automatic manipulation involves the use of a manipulator member adapted to move along a path defined on a workpiece. The method may include the step of storing, in a programming mode, the coordinates of a plurality of positions along a path to be followed by the member to develop a path program. The path program is executed in a playback mode to cause the member to move along the programmed path. The workpiece is monitored with a path sensing probe that is moved with the member in the playback mode. Deviations in the workpiece not represented by the path program are temporarily stored. The pattern of movement of the member is corrected during the playback mode in response to the deviations temporarily stored during the playback mode.

DESCRIPTION OF A PREFERRED EMBODIMENT

Figure 1:
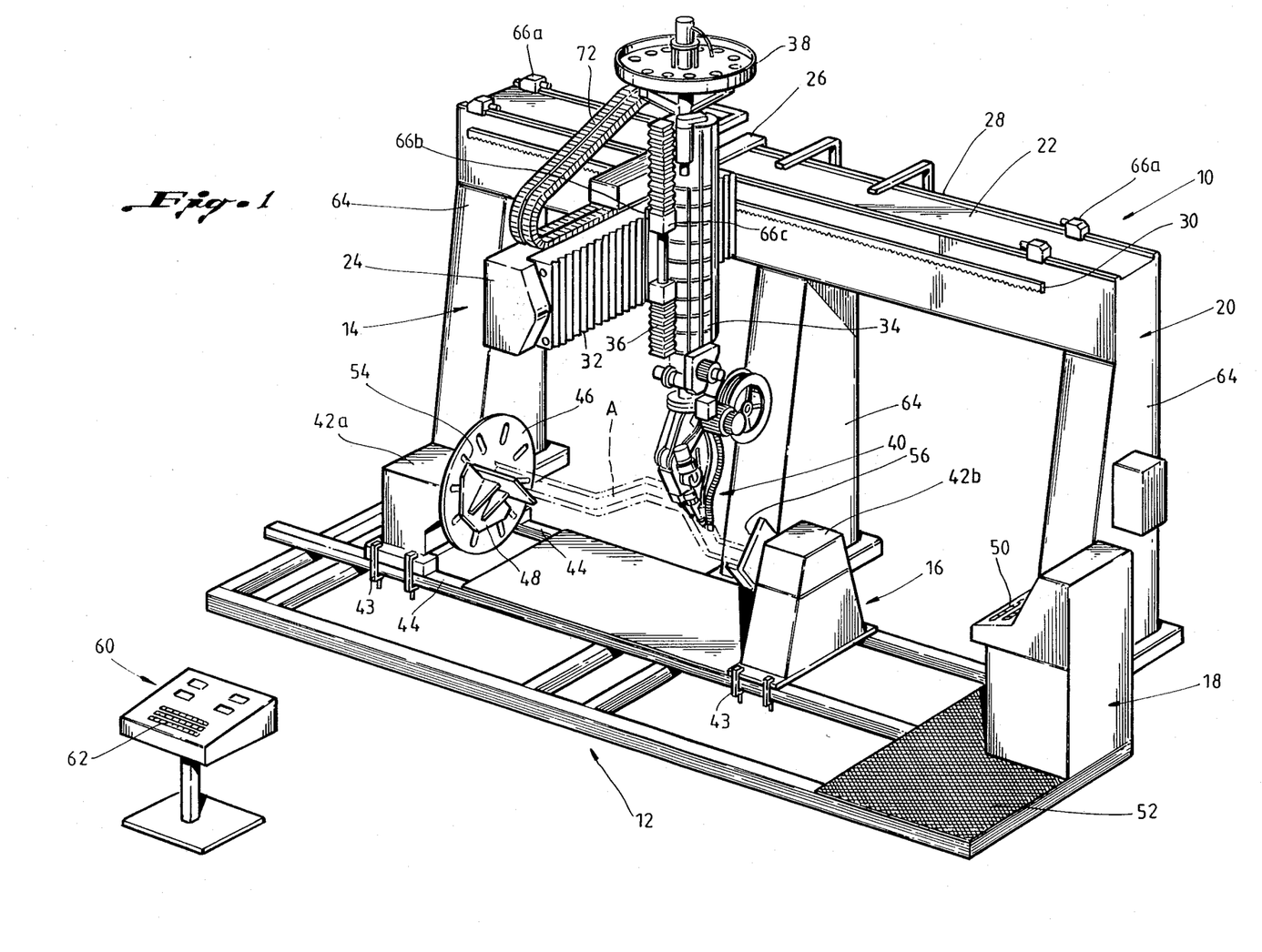
FIG. 1 is a perspective view of one embodiment of the present invention.

Referring to the drawing wherein like reference characters are utilized for like parts throughout the several views, a programmable automatic manipulator apparatus 10, shown in FIG. 1, includes a planar support 12, a manipulator member 14, a workpiece positioner 16 and a control station 18. The control station 18 enables an operator to input a variety of manipulator parameters which may be desired for specific operations during the programming or playback of a programmed set of operations.

The manipulator member 14 includes a bridge 20 defining a track 22 that slidably mounts a transverse bar 24. Thus the bridge 20, which may be stationary, allows sliding movement in a horizontal plane of the transverse bar 24 along the length of the bridge 20. The bar 24 includes a U-shaped bracket 26 which envelops the horizontal beam 28 of the bridge 20. The bar 24 is powered for movement along the track 22 by a motor (not shown) which operates on the track 22 through a rack and pinion arrangement 30. The transverse bar 24 conveniently slides in a cylindrical guideway with hardened ground steel ball bushings (not shown).

The transverse bar 24 is capable of movement in a direction transverse to the length of the beam 28 and parallel to the length of the bar 24 itself. This is made possible by a conventional screw mechanism (not shown) covered by a pleated sheath 32. A vertically oriented housing 34 is mounted for movement along the transverse bar 24. However the housing 34 is itself capable of up and down movement through the ball screw unit 36 which mounts the housing 34 on the transverse bar 24. The vertically oriented housing 34 includes an annular wire organizer 38 which separates and locates the various wires and tubes necessary for control of the member 14 during movement of the various parts of the apparatus 10. A manipulator arm 40 is mounted on the lower portion of the vertically oriented housing 34.

Like the manipulator member 14, the workpiece positioner 16 is mounted on the planar support 12. The positioner 16 includes a pair of spaced apart posts 42 aligned along the length of the beam 28 but spaced therefrom. The transverse bar 24 extends from the beam 28 to a point well past the posts 42. Each of the posts 42 is mounted on a pair of tracks 44. Thus, each post 42 may be slid along the tracks 44 to vary the spacing of the posts 42 with respect to one another. This permits accommodation for workpieces of different sizes.

The post 42a mounts a rotatable disc 46 that faces the post 42b and is rotatable about a horizontal axis parallel to the length of the beam 28. The disc 46 includes a workpiece mounting bracket 48 which enables the post 42a to connect to one end of a workpiece, indicated as A in FIG. 1, to be operated upon. A set of clamps 43 releasably fix each post 42 at a desired position along the tracks 44.

The disc 46 includes a plurality, of circumferentially distributed short elliptical slots 54 arranged radially about the disc 46. The bracket 48 may then be secured by bolts within any desired set of slots 54. Moreover the position of the bracket 48 on the disc 46 may be adjusted by sliding the bracket 48 with respect to the disc 46 before tightening the bolts. This permits control over the initial positioning of the workpiece A. Similarly, the plate 56 mounted on the post 42b includes a slot 58 which permits sliding movement of the bracket 48 with respect to the post 42b in order to position the workpiece A as desired. The bracket 48 and plate 56 may be mounted on the posts 42 for vertical reciprocation. Then the position of the workpiece may be angularly and vertically varied by servo control.

The control station 18, also mounted on the planar support 12, includes a keyboard 50 and a cathode ray tube (not shown) connected with the keyboard 50. An operator platform 52 may be defined adjacent the control station 18. The control station 18 is in electrical communication with the manipulator member 14, the workpiece positioner 16 and the remote portable control unit 60.

The control unit 60 includes pushbuttons 62 which enable various welding parameters and control operations to be entered during the programming or operation of the apparatus 20. Because of the portable nature of the control unit 60, the operator may position himself or herself to the most desirable position to view and control the operation of the apparatus 10.

Although the manipulator member 14 is illustrated in the form of a stationary device fixed to an immobile planar support 12, it should be understood that the bridge 20 could also be mounted on tracks so that the entire apparatus could be moved along the pair of parallel tracks (not shown) generally transversely to the length of the beam 28. Similarly, instead of utilizing a set of three vertical supports 64 which support the beam 28, a single support 64 (not shown) could be utilized which cantilevers the beam 28. This single support 64 could also be mounted on a pair of parallel tracks (not shown) so that the beam 28 could be slid along an axis perpendicular to the length of beam 28.

In an arrangement wherein the bridge 20 is mounted on a pair of tracks for movement in a direction transverse to the length of the beam 28, the transverse bar 24 may be dispensed with if desired. In addition it may be desirable to orient the workpiece positioner 16 in a direction transverse to the direction illustrated in FIG. 1. Finally, it should be understood that, in any case, the provision of the workpiece positioner 16 is optional. While the positioner 16 provides for additional control over relative positions of the manipulator member 14 and the workpiece A, and potentially in greater speed of operation, the workpiece positioner 16 could be dispensed with in specific embodiments and replaced with a conventional jig.

Along each axis of movement described above, limit switches 66 are provided to sense when the apparatus 10 has reached the full extent of possible movement in one particular direction. Thus a set of limit switches 66a are mounted along the track 22 in order to sense the positioning of the transverse bar 24 at either end of its full extent of movement along the beam 28. Similarily limit switches 66b are mounted on the transverse bar 24 to sense the full extent of movement of the vertically oriented housing 34 with respect to the bar 24. Finally limit switches 66c are positioned on the vertical housing 34 in order to sense its positioning at the limit of its movement either up or down. A set of two angled, articulated, flexible conduits 72 provide for electrical communication between the transverse bar 24 and the vertical housing 34.

Figure 2:
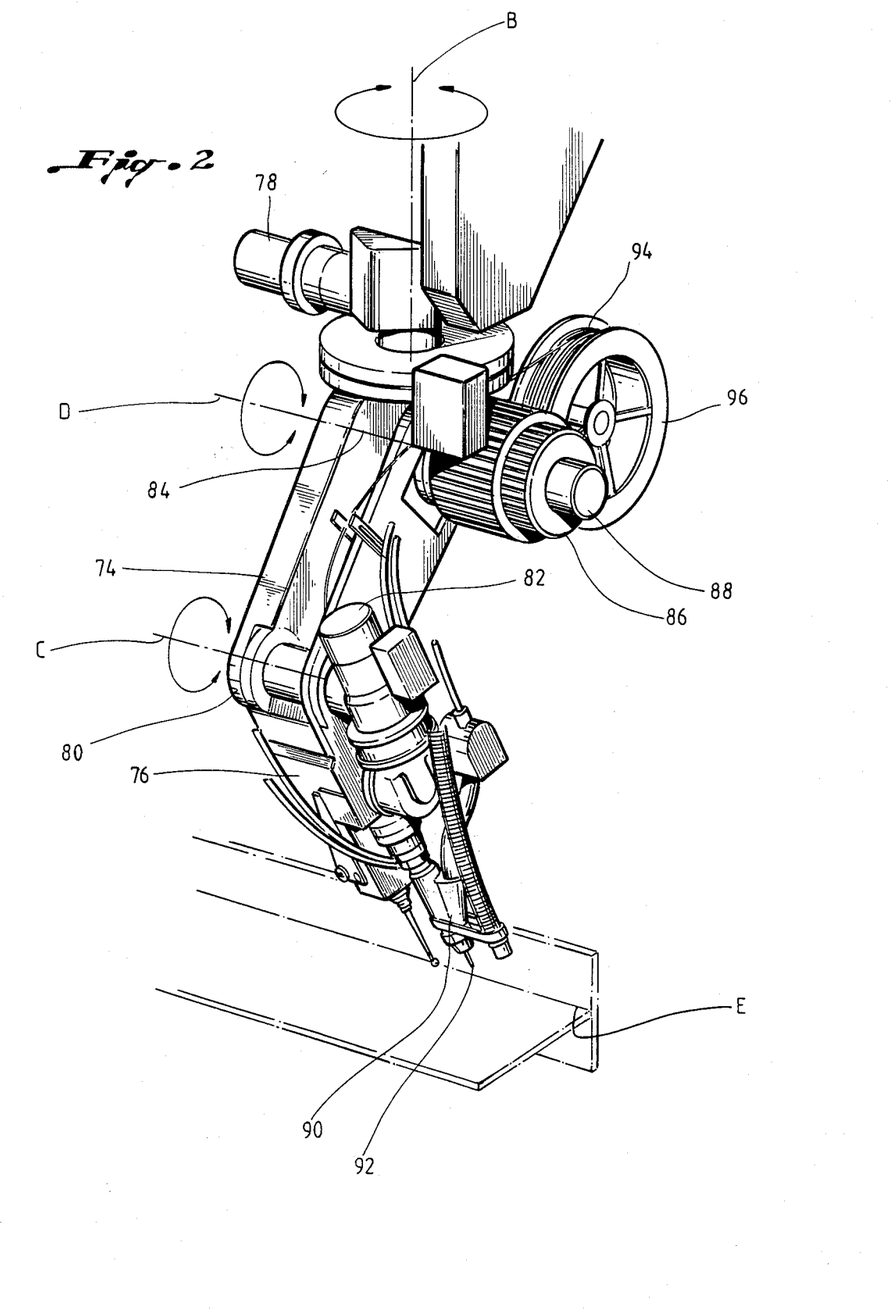
FIG. 2 is an enlarged perspective view of a portion of the apparatus shown in FIG. 1, focusing on the manipulator member.

The manipulator arm 40, shown in FIG. 2, includes a pair of relatively pivotable links or segments 74 and 76. The segment 74 is connected to the rest of the vertically oriented housing 34 for rotation about the vertical axis "B" by the motor 78. The segment 74 connects to the segment 76 through the pivot joint 80. The two segments 74 and 76 rotating respectively around the axes "B" and "C" are operated by the motor 86 through a steel strip transmission having a gear ratio of 2 to 1 between axes D and C. In this way the torch tip 92 is always maintained along the vertical axis "B." The position of motor 86 is constantly monitored by digital position encoders 88.

In the illustrated embodiment, the tool attached to the free end of the manipulator arm 40 is a welding torch 90. While the present invention is illustrated in an embodiment adapted for welding, it should be understood that the present invention may be adaptable to any number of various operations conventionally implemented by programmed manipulators and particularly to those apparatus which involve the use of a path following probe. Although the welding torch 90 may take a variety of formats, in the illustrated embodiment, the welding torch 90 is a torch suitable for use in submerged arc welding. The torch 90 includes a tip 92 which is normally spaced from the seam "E" to be welded.

The welding torch 90, in the illustrated embodiment, uses cored wire 94 fed from a reel 96 connected to the segment 74. The reel 96 is automatically unwound to feed the wire 94 into the torch 90 where it exits from the tip 92. The cored wire is consumed during in process of welding. However while the present invention is illustrated in connection with a welding torch 90 that uses cored wire, gas shielded open arc or other welding techniques, as well as submerged arc welding processes, may be implemented by the present invention.

Figure 3:
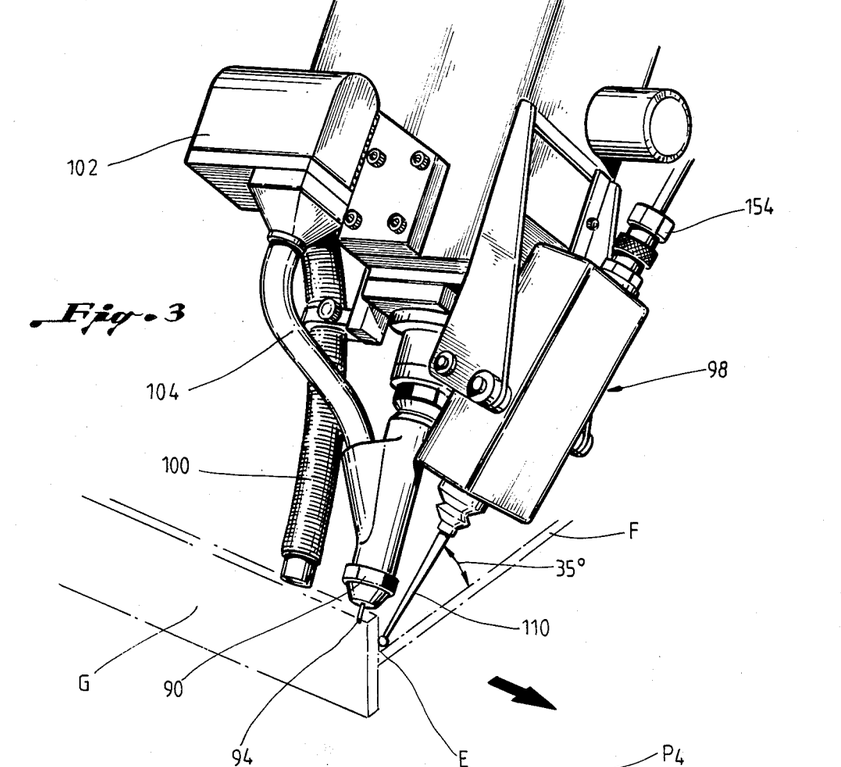
FIG. 3 is an enlarged perspective view of a portion of the member shown in FIG. 2, focusing particularly on the free end of the manipulator member.

Referring now to FIG. 3, the free end of the manipulator arm 40 includes, in addition to the welding torch 90, a probe unit 98 and a flux dispenser 104. In the illustrated embodiment, involving the use of a submerged arc welding torch 90, a consumable continuously advanced electrode or wire 94 is fed beneath a powdery flux (not shown). The flux is a granular bed of material which totally envelopes the welding electrode and therefore suppresses spray sparks, splatter and gases. As a result, the welding operation tends to be cleaner.

The powdery flux is fed pneumatically from a remote reservoir (not shown) outwardly through the flexible dispenser 104 positioned to follow the welding torch along a seam "E" to be welded. The flux spreads concentrically from the flux dispenser 104 in all directions and therefore envelopes the region around the welding torch tip 92 so that the arc struck by the welding torch 90 is covered by a bed of flux. The interlock valve 102, when activated, allows the flux to fall down and cover the arc. At the end of the welding process, the interlock valve 102 is released to stop the flow of flux.

The welding wire 94 is fed into the torch 90. Particularly in the case of submerged arc welding, relatively thick welding wire 94 is utilized and therefore it is important to smoothly convey the welding wire in a continuous fashion. However, conventional apparatus is available for this purpose. After welding has been accomplished the flux may be vacuumed up via the hose 100.

For fillet weld applications, the entire assembly including both the torch 90 and the finger 110 are maintained at an angle of about 35° from the horizontal plane, defined in the embodiment shown in FIG. 3 by the horizonal plate "F" to be welded to the vertical plate "G" at the seam "E". The welding torch 90 on the other hand lies generally in a vertical plane. The distance between the probe finger 110 and the tip 92 may be set at about 30 millimeters.

Figure 5:
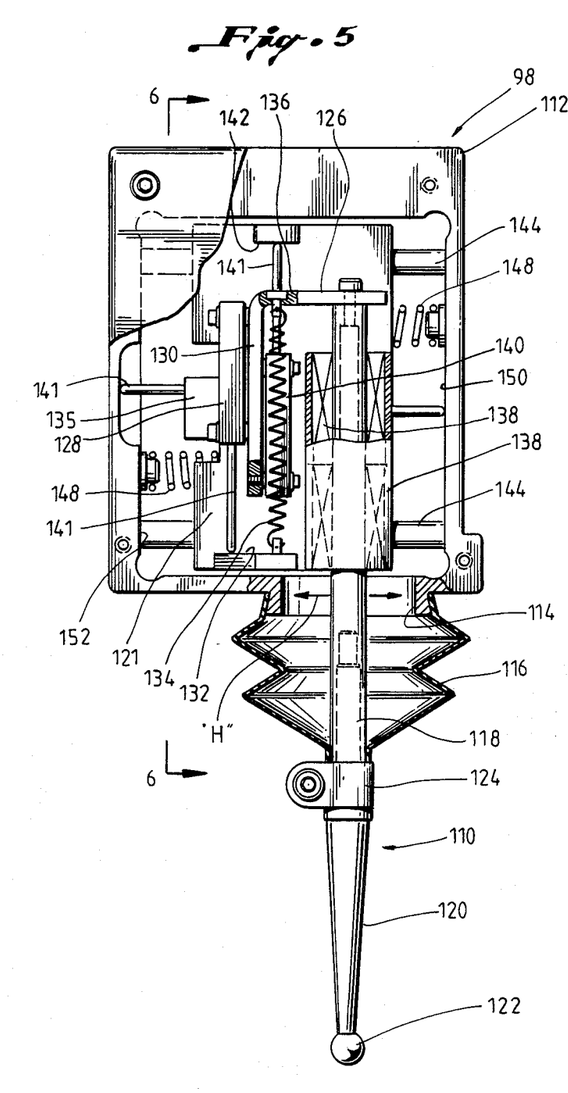
FIG. 5 is an enlarged, broken away elevational view of the probe shown in FIG. 3.
Figure 6:
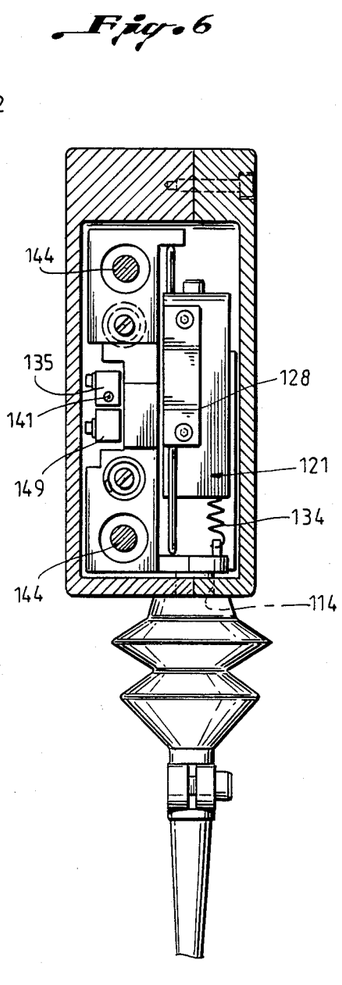
FIG. 6 is a cross-sectional view taken generally along the lines 6—6 in FIG. 5.

As shown in FIGS. 5 and 6, the probe unit 98 includes a generally rectangular housing 112. The finger 110 extends into the housing 112 through an elliptical opening 114 closed by a rubber protection sleeve 116. The elliptical opening 114 is oriented with its length generally perpendicular to the direction of forward movement. The finger 110 includes a generally tubular portion 118 connected to a tapering portion 120 including a ball 122 at its free end. The tubular portion 118 and the tapering portion 120 are connected at a joint 124.

A movable assembly 121, contained within the housing 112 includes the spring 134, L-shaped piece 126, and potentiometers 128, 140. The innermost end of the tubular portion 118 is connected to the L-shaped piece 126. A telescoping potentiometer 128 is mounted on one leg 130 of the piece 126 and the telescoping bar 141 of the potentiometer 128 engages the lower wall 132 of the housing 112. A coil spring 134 extends from the leg 136 to the lower wall 132. A pair of ball bushings 138 are positioned to surround the tubular portion 118. A second telescoping potentiometer 140 is attached to the inside surface of the leg 130 but extends oppositely from the potentiometer 128 to engage the upper wall 142 of the housing 112. Thus, in response to inward deflection of the finger 110, the spring 134 is stretched and the potentiometer 140 is depressed. Conversely in response to outward deflection of the finger 110, the spring 134 is compressed and the potentiometer 128 is depressed.

As shown in FIG. 6, the assembly 121 can slide along the bars 144 in the direction, indicated by the arrows H in FIG. 5, perpendicular to the direction of forward movement (solid arrow in FIG. 3). Adjacent and extending parallel to each bar 144 are potentiometers 135, 149. Thus, when the assembly slides in the direction of the arrows H, the extent of movement of the bars 141 with respect to the potentiometers 135, 149 is sensed. The assembly 121 is biased to a central position by the coil springs 148 between the assembly 121 and the opposed sidewalls 150 or 152.

In response to inward or outward deflection of the finger 110 with respect to the housing, a position signal is generated which is transmitted from the housing 112 through the wire 154, shown in FIG. 3, to the control station 18. Similarily in response to sliding movement of the finger 112 along the direction indicated by the arrows H, a different signal is generated which is indicative of the extent of motion along another axis of movement.

While the present invention has been described in connection with a probe unit 98 of the path contacting variety, it should be understood that certain advantages of present invention may be achieved with any type of path sensing probe. For example, probes that use magnetic or optical energy to detect the workpiece path configuration to be followed may be suitable in certain applications.

Figure 7:
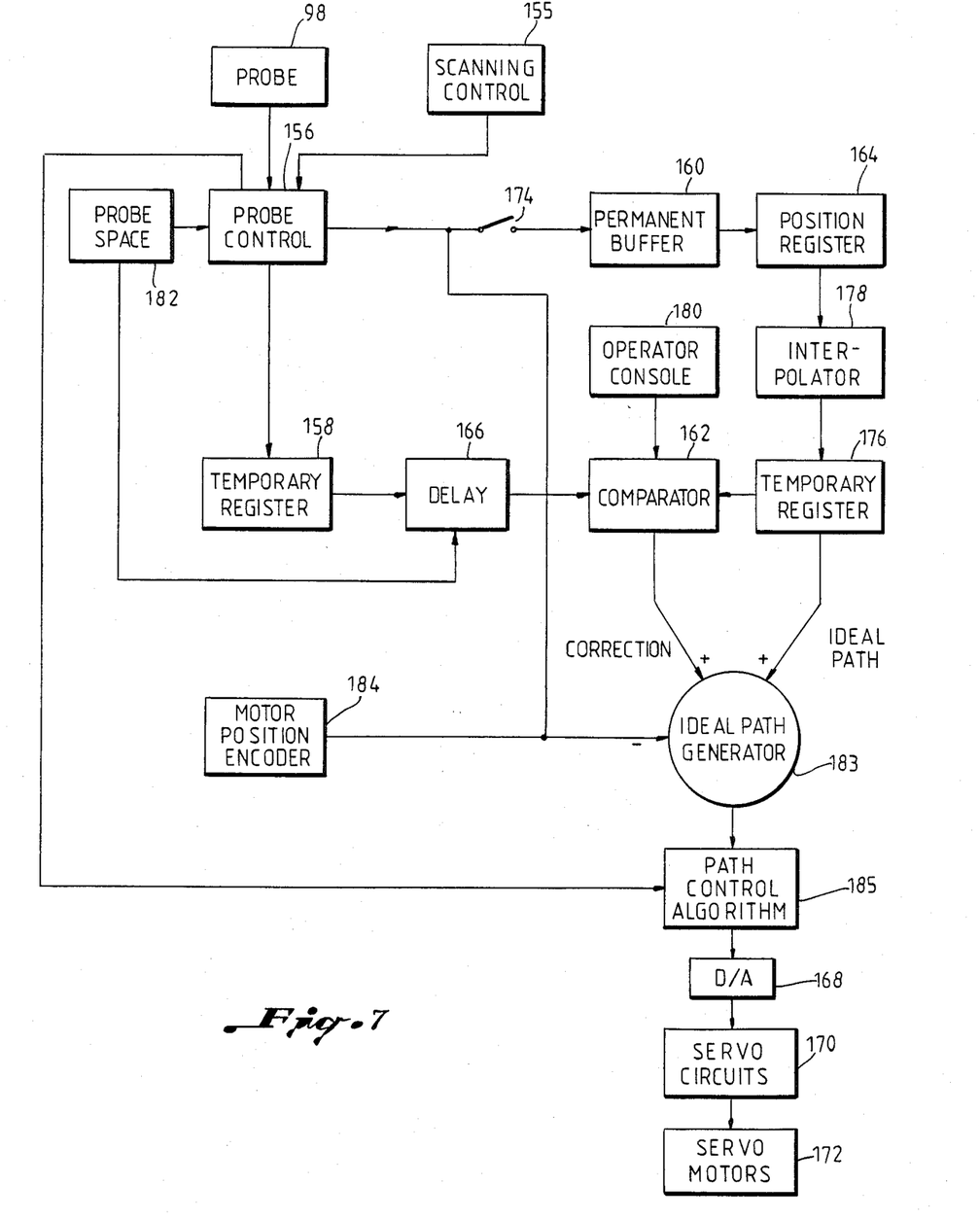
FIG. 7 is an electronic schematic showing one embodiment for implementing the present invention.

According to one electronic implementation of the present invention, shown in FIG. 7, the computer, numerical control and associated interfaces, may be contained within the control station 18. The probe unit 98, discussed previously, is connected to a probe control 156. The probe control 156 interprets the position signals generated by the potentiometers 128, 135, 140, 149. Initially the probe control 156 converts those signals from DC analog signals to digital signals. Then the signals are processed together with the apparatus real positions and the real position of the followed path is determined and stored in a temporary storage 158.

More specifically, the signals from each potentiometer 128, 135, 140, 149 are converted into digital signals which are then analyzed to determine if the signals correspond to displacements which exceed some user definable predetermined level. If these signals exceed that level, they are thereafter considered signals corresponding to a "significant" change of course of the path to be followed by the torch 90. Thus, referring to FIG. 4, an exemplary three dimensional path of movement of the probe unit 98 and torch 90 is indicated by the solid S-shaped curved line "I". Points along the line "I" which could constitute significant deviations detected by the probe control 156 are indicated as the points P1, P2, P3 and P4.

The probe control 156 also periodically interrogates the probe unit 98. More specifically, at predetermined intervals determined by the scanning control 155, the probe control 156 interrogates the probe unit 98 to determine the real position on the path currently being sensed by the probe unit 98. This may be accomplished at any desired regular or periodic interval. However, in one embodiment of the present invention interrogation takes place every three millimeters of movement of the probe finger 110 along the seam E.

Thus the probe control 156 in essence compares the interrogated position signals determined at regular intervals with a predetermined standard in order to determine whether or not the position signal sensed is one corresponding to a significant deviation. In response to this decision, an appropriate output from the probe control 156 is conveyed either to the temporary register 158 or the permanent buffer 160.

The temporary register 158 is connected to the comparator 162 through the delay unit 166. The delay is needed to compensate for the fact that probe 98 actually leads the torch 90. The position signals stored in the register 158 after a delay provided by the delay unit 166, are compared with the previously recorded position provided by the temporary register 176. A correction signal calculated by the interpolator 178 is implemented over the next interrogation period and applied gradually. Thus, in between the time that the probe control 156 first interrogates the probe unit 98 and the time of the next interrogation, the correction stored in the temporary register 158 is gradually implemented.

The necessary correction is formulated in the comparator 162. The comparator 162 receives information from the interpolator 178 which develops the ideal correction to each position stored in the position register 164. In the playback mode, the signals stored in the temporary register 158 are compared after a delay created by the delay 166, with corresponding signals stored in the temporary register 176, generated by the interpolator 178 based on input from the position register 164. The difference is outputted from the comparator 162 and used to correct position references. The corrected position reference in the form of the correction plus ideal path position, is compared in the ideal path generator 183 with a signal from the motor position encoder 184. The output signal which is a representation of the ideal path to be followed is inputted to the path control algorithm unit 185. The unit 185 compares the probe 98 real position signals from the probe control 156 with the signal from the generator 183 to produce a motor error (position correction) signal. This last signal is then outputted to the digital to analog converter 168. The digital to analog converter 168 converts the digital error signal from the comparator 162 into a control signal which operates the servo circuits 170. The servo circuits 170 in turn control the specific motors 172 for the particular axis which needs correction.

The same operation occurs both in the programming mode and in the playback mode. However during the playback mode the switch 174 is opened. Under predetermined conditions, real positions, read by the encoders 184, are loaded through the switch 174 into the permanent buffer 160 for subsequent playback.

The position register 164 is connected to a temporary register 176 by way of an interpolator 178. The comparator 162 receives inputs from the operator console 180 which may take the form of the control station 18 or the control unit 60. A variety of inputs may be supplied through the operator console 180 including the desired tangential speed of movement and welding parameters such as weld time, welding arc speed, welding voltage and amperage. The operator may also input a torch "on" or torch "off" signal for each recorded point.

Figure 4:
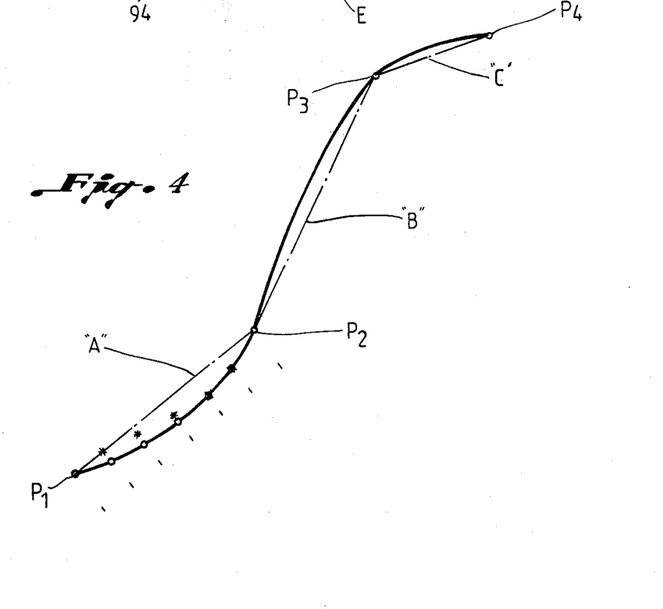
FIG. 4 is a schematic map of an exemplary pattern of movement of the apparatus shown in FIG. 1, indicating how the path of movement may be stored and recreated for subsequent playback.

The interpolator 178 is responsible for developing a straight line approximation of the weld path including segments connecting each pair of adjacent significant points. Thus as shown in FIG. 4, a straight line interpolation "J" connects the points P1 and P2, a straight line interpolation "K" connects the points P2 and P3, and a straight line interpolation "L" connects the points P3 and P4. The interpolator 178 not only determines the necessary straight line equation at the time of playback, but it also evaluates the equation to determine intermediate points or reference positions between these recorded significant points.

Successive numerical reference positions are calculated between two memorized points (e.g., points P1 and P2, shown in FIG. 4) as follows. First, the distance between the two memorized points is determined by subtracting their stored coordinants and applying Pythagoras' theorem. This distance, in each axis, is then divided by the maximum desired tangential speed, which is inputted by the operator for each straight line connecting significant points, and the programmed speed reducing factor. The tangential speed is inputted on the keyboard 50 programmed with the numbers from 1-99. These numbers represent the corresponding percentage of full speed. This calculation results in the number of samples needed to get from P2 to P1 at the desired tangential speed, "N":

$$N = \frac{"P2-P1"}{Vmt \times R \times F} \quad [1]$$

WHERE
"P2-P1" = distance between two memorized points
Vmt = maximum tangential speed on path or the tangential speed divided by the time per interval (bits/sample)
R = programmed speed reducing factor (%)
F = speed reducing factor introduced by feed rate override commutator The number "N" is the number of intervals or samples or intermediate points (indicated by hash marks in FIG. 4) between two memorized points.

Then the distance moved in each axis is divided by "N" to determine the space increment (Vxn) for each interval per each axis:

$$Vxn = \frac{X_{P2} - X_{P1}}{N} \quad [2]$$

WHERE
$X_{P2}$ = x coordinates of point P2
$X_{P1}$ = x coordinates of point P1

Thereafter, at each interval, a speed correction related to probe sensed deviation is added to the programmed speed. This result is obtained from the equation $$X(n) = X_{P1} + \sum_{o}^{n} [Vxn + Vcxn] \quad [3]$$

WHERE
X = reference position for given axis X at sample "n"
Vxn = speed to follow ideal path (bits/sample)
Vcxn = speed correction for probe sensed deviations The speed correction Vcxn is determined by subtracting probe sensed seam coordinates in a given axis from the corresponding coordinate as recorded in the program. This value is then divided by the number of samples needed to run over the interrogation interval "D". Thus, the speed correction may be determined by the following equation:

$$Vcxn = \frac{Xs - Xi}{M} \quad [4]$$

WHERE
Xs = x position of the seam sensed by the probe
Xi = x position of seam according to the program
M = number of samples The number of samples "M" may be calculated as follows:

$$M = \frac{D}{Vmt \times R \times F} \quad [5]$$

WHERE
D = interrogation interval (bits) e.g. corresponding to the 3 mm. interval The intermediate positions (marked by x's in FIG. 4) are used to continuously reposition the torch 90 by means of conventional servo positioning techniques to the ideal path positions (indicated by circles in FIG. 4).

The space between the finger 110 and the torch 90 may be adjusted by the user. Then a probe space adjustment must be inputted at the adjuster 182 which corresponds to the new spacing. The probe space adjuster 182 advises the probe control 156 of the change and also notifies the delay unit 166. The delay unit 166 provides for the delay of the command signal suggested by the probe unit 94 necessary to compensate for the fact that the torch 90 trails behind the probe unit 98. Thus the greater the spacing between the torch 90 and probe unit 98 the longer the delay, and vice versa.

The output from the digital to analog converter 168 is conveyed to the respective servo circuit 170 corresponding to the axis under consideration. Normally each axis of movement is corrected in a sequential fashion whereby the comparator works from axis to axis in rapid succession. The result of the servo circuit 170 is then directly conveyed to the servo motors 172 to provide the desired correction. The servo motors 172 are also connected to the probe control 156 through the path control algorithm unit 185 so that if an extreme deviation is sensed by the probe 98, the servo motors 172 may be immediately shut off. For example, if the radius of curvature detected by the probe unit 98 is less than a predetermined amount, the servo motors may be immediately shut off by the probe control 156.

When the apparatus 10 is operating in a point-to-point mode, the servo circuits 170 continue their iterative cycle until exact coincidence with the preprogrammed position is achieved. However when the apparatus 10 is operating in a continuous mode, wherein the apparatus 10 does not stop at each point, the servo circuits 170 terminate the cycle when the error signal falls below a operator selectable predetermined level. At that time the servo circuits 170 provide a signal through the motor position encoders 184 to the ideal path generator 183 to terminate the comparison and to move on to the correction of the next axis.

The present invention is capable of being implemented in a variety of different programming modes. In the first mode, termed "teaching by showing," the manipulator arm 40 is positioned by the operator, working at the control unit 60, in at least two successive positions. Then the operator inputs the desired form of interpolation between those two points. The desired interpolation can take any of a variety of preset configurations such as a circular path of movement between the two points or a straight line path of movement between the two points. The necessary interpolation is inputted from the operator console 180 to the interpolator 178 which automatically provides for the storage of the desired parameters in connection with the two memorized points.

Alternatively, the apparatus may be operated in a completely self-teaching mode. When the torch 90 is positioned in the seam E, the torch 90 and the probe unit 98 are then automatically powered to follow the contour of the seam to be welded. The seam should be defined by a surface irregularity containing the finger 110. For example, the surface irregularity could be an angle junction between two parts to be welded, a groove, or any other suitable surface configuration. The manipulator arm 40 is then given an initial direction of movement and a pre-set velocity in one axis perpendicular to the length of the finger 110 and the direction H. The probe unit 98 is then monitored at regular intervals, as described above, in order to detect path deviations from the initial direction. These deviations, sensed by the potentiometers 128, 135, 140, 149 are converted into position correction signals which are supplied to the torch 90 to position the torch 90 at a desired orientation to the seam E and to cause the torch 90 to follow the probe unit 98.

In one form of the self-teaching mode, the apparatus 10 including the probe 98 and the torch 90 are self-powered along the complete seam to be welded. Thereafter the desired path is stored in memory and subsequent pieces having the same general seam configuration may be welded one after another. In addition, the teach mode and the playback mode may be simultaneous. Then the apparatus 10 automatically welds at the same time it is learning the desired path of movement. Although it may be necessary to use a slower speed of operation, the necessity to have a first learning mode and a second playback mode is eliminated with respect to the first workpiece. Thereafter it is no longer necessary with subsequent pieces to re-learn the program and subsequent pieces may be welded using the normal playback operation.

In each mode of operation, once the path is memorized, welding parameters are inputted from the keyboard 50 by an operator to complete the program. The stored program, in a form of a plurality of significant points and welding parameters, may be stored on a cassette tape.

With the present invention, the apparatus 10 may adapt to changes in the configuration of the workpiece which were not preprogrammed. Thus, when a slight deviation in the workpiece is encountered which differs from the path previously programmed, the apparatus 10 is able to accommodate to the changed conditions without altering the previously programmed path of movement. This is important since the stored program will most likely be accurate for most workpieces and any delay inherent in reprogramming is avoided. This capability is made possible by the fact that the probe unit 98 is implementing course corrections both in the teaching mode and in the playback mode. In response to a slight deviation in the path from the programmed path, the probe unit 98 detects this deviation and causes an appropriate signal to be stored in the temporary register 158 for correction of the torch 90 position. This causes the torch 90 to follow the actual path encountered in a specific workpiece to be welded through the immediate intercession of the comparator 162.

The operation of the probe unit 98 in the playback mode to accommodate for unexpected deviations is significant since use of the probe unit 98 to input corrections during the playback mode also enables the use of computers with significantly less computing power and memory capacity. This is because, compared to many conventional devices, much less data must be stored and a simple interpolation technique is possible. In effect it is only necessary to store significant deviations along the path and furthermore only straight line interpolation is required between those significant points. However, precision is not sacrificed because the stored data only provides a first, correctable "estimate" of the path to be followed, which is supplemented, corrected and updated by the probe unit 98.

While the present invention has been described with respect to a limited number of embodiments, those skilled in the art will appreciate a number of modifications and variations and it is intended within the appended claims to cover all such modifications and variations that fall within the true spirit and scope of the present invention.

What is claimed is:

1. A programmable automatic manipulator apparatus adapted to move along a path defined on a workpiece, said apparatus comprising:
   a manipulator member capable of mounting a tool whose position is controllable by said apparatus in at least two dimensions;
   a path following probe mounted on said member adjacent said tool, said probe including a path sensing finger, said probe further including a transducer for converting sensed variations of said path into workpiece position signals;
   an interrogator for periodically sampling said position signals, said interrogator including a comparator for determining whether said position signals correspond to variations that exceed a predetermined extent;
   a first data storage medium adapted to permanently store representations of said sampled position signals that exceed said predetermined extent;
   a second data storage medium adapted to temporarily store sampled position signals; and
   a tool position control adapted to correct the tool position in response to said representations of said position signals temporarily stored in said second data storage medium, before said tool completely traverses said path.

2. The apparatus of claim 1 wherein said sensing finger is a path contacting finger displaceable with respect to the rest of said probe in response to variations in said path.

3. The apparatus of claim 2 wherein said probe is displaceable in only two directions, said directions being transverse with respect to one another.

4. The apparatus of claim 1 wherein said probe is located in a position in front of said tool.

5. The apparatus of claim 1, said apparatus being operable in a first mode wherein a path to be followed is programmed into said apparatus and a second mode wherein said apparatus is operated to playback the previously programmed pattern of movement.

6. The apparatus of claim 5 wherein said interrogator periodically samples said position signals from said probe during said programming mode and also during said playback mode.

7. The apparatus of claim 6 wherein said probe produces position signals during the playback mode utilized by said tool control to correct the position of said tool in said playback mode with respect to the configuration of the workpiece.

8. The apparatus of claim 1 wherein said apparatus is adapted to follow deviations in a workpiece which do not correspond to a programmed path of movement without altering the previously stored programmed path of movement.

9. The apparatus of claim 1 wherein said representations of position signals stored in said second data storage medium are implemented through said tool position control during the period immediately following the period in which said variation was sensed by said probe.

10. The apparatus of claim 1, said interrogator including a delay device for implementing an adjustable delay between the implementation of said representations of said position signals by said control and the sensing of said position signals in order to accomodate for the spacing between said probe and said tool.

11. The apparatus of claim 1 including means for mathematically determining a straight line equation which connects the points stored in said first data storage medium, said determining means electrically connected to said first data storage medium.

12. The apparatus of claim 11 wherein said determining means includes means for calculating the sum of an ideal path following speed and a speed correction for deviations sensed by said probe, said determining means further including means for adding said sum to the coordinates of a previously recorded coordinate point.

13. The apparatus of claim 11 wherein said determining means is adapted to determine said straight line equation only during the playback of the programmed path of movement.

14. The apparatus of claim 11 wherein said interrogator is adapted to continue to interrogate said probe position signals during playback in order to correct said straight line interpolation to correspond to the correct workpiece path.

15. The apparatus of claim 3 wherein said tool is a welding torch.

16. The apparatus of claim 15 wherein said tool includes a device for supplying a flux to the path of said tool, said flux applicator being positioned behind said torch with respect to the direction of forward movement of said torch and said probe being positioned in front of said torch with respect to the direction of forward movement of said torch.

17. A method for programmed automatic manipulation involving the use of a manipulating member adapted to move along a path defined on a workpiece, said method comprising the steps of:
   storing in a programming mode, the coordinates of a plurality of positions along a path to be followed by said member to develop a path program by traversing a path sensing probe over a path to be programmed and storing path position signals generated by said probe;
   determining whether said path position signals correspond to deviations of the path that exceed a predetermined extent and permanently storing in said path program only those signals corresponding to deviations exceeding the predetermined extent;
   executing said path program, in a playback mode, to cause said member to move along said programmed path;
   monitoring the workpiece with said probe, in said playback mode;
   temporarily storing deviations in said workpiece sensed by said probe but not represented by said path program; and
   correcting the pattern of movement of said member during said playback mode in response to said deviations temporarily stored during the playback mode.

18. The method of claim 17 wherein the step of traversing said probe over said path includes the step of powering said probe in a first direction over said path and correcting the position of said member in response to signals derived from said probe during said programming mode.

* * * * *